M. LEITCH.
CENTRIFUGAL CLARIFIER.
APPLICATION FILED AUG. 19, 1919.
1,370,326.
Patented Mar. 1, 1921.
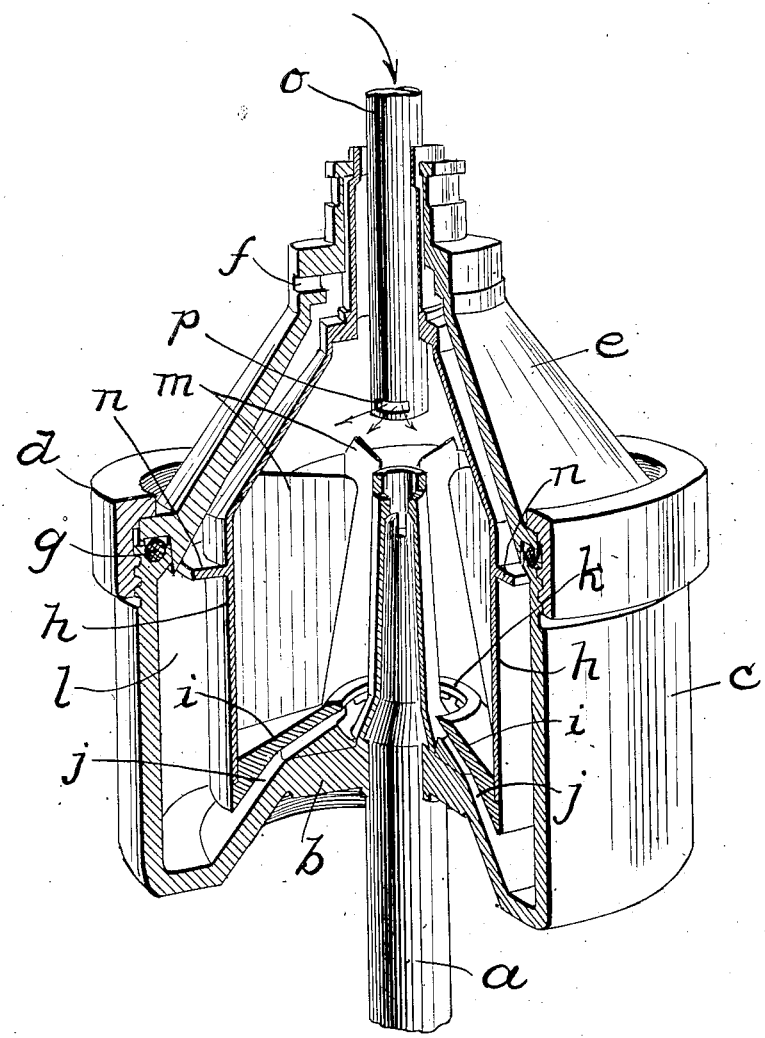
WITNESS:
INVENTOR
Meredith Leitch
BY
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, OF NEW YORK, N. Y., A CORPORATION OF NEW JERSEY.

CENTRIFUGAL CLARIFIER.

1,370,326.      Specification of Letters Patent.      Patented Mar. 1, 1921.

Application filed August 19, 1919. Serial No. 318,559.

*To all whom it may concern:*

Be it known that I, MEREDITH LEITCH, a citizen of the United States, residing at Poughkeepsie, county of Dutchess and State of New York, have invented a new and useful Improvement in Centrifugal Clarifiers, of which the following is a full, clear, and exact description, reference being had to the accompanying drawings, which form a part of this specification.

My invention relates to centrifugal clarifying bowls and has for its object the provision of a bowl which will hold a large quantity of sediment. It is a well known fact that sediment collected in centrifugal clarifiers is seldom deposited evenly around the periphery of the bowl and that when unevenly deposited the bowl soon becomes so badly unbalanced that it has to be stopped and cleaned long before the dirt holding space is filled.

In my invention I provide for the heavier sediment, easily collected, a chamber near the center of the bowl, where the influence of the sediment on the balance will be a minimum and pass the liquid to be clarified first through this chamber and then, when freed of the coarser and heavier particles, through an annular clarifier of larger diameter to remove the finer and less readily collectible sediment; and combine, with that arrangement, other features insuring, as nearly as possible, an equal flow through all quarters of the bowl and a substantially perfect elimination of the sediment and avoiding any uneven deposition of sediment that would cause unbalancing.

In the drawing, which illustrates a preferred embodiment of my invention, the figure is a perspective view, partly broken away, of my improved clarifier.

The revoluble bowl spindle $a$ is supported and driven in the ordinary manner. The bowl bottom $b$ has a shell $c$ to which is secured, by a coupling ring $d$, a bowl top $e$ with outlets $f$. A tight joint between the bowl shell $c$ and the top $e$ is made by a rubber ring $g$.

Within the bowl shell $c$ and top $e$ and concentric therewith is the wall $h$ separating the two chambers of the bowl. Above the bottom $b$ of the bowl is a false bottom $i$ forming a bottom for the central chamber and having cut through it contracted passages $j$ leading from below the central discharge weir $k$ to the outer annular chamber $l$.

Secured to the inside of the wall $h$ are several wings $m$. Secured to the outside of the wall $h$ is a ring $n$ approaching closely to the inside of the bottom of the bowl top $e$.

$o$ is a feed tube for delivering liquid to be clarified into the bowl. This tube is closed at the bottom and provided with a vertically short but circumferentially extensive opening $p$ adapted to deliver a flat horizontal stream.

In operation, the bowl is revolved at a high speed. The liquid to be clarified is supplied to the tube $o$ and, escaping horizontally through the outlet $p$, enters the upper part of the central chamber. The wings $m$ cause the liquid to revolve with the bowl. The liquid quickly fills the central chamber and escapes over the circular weir $k$. While passing downward in the central chamber the heavier and coarser solid particles are thrown by centrifugal force against the inside of the wall $h$ and there deposited. Only the partially clarified liquid escapes over the weir $k$ and, flowing outward through the passages $j$, soon fills the annular outer chamber $l$. As the liquid passes upward through the space $l$, it is subjected to a much greater centrifugal force, which throws out sediment too fine and light to be thrown out in the central chamber. The ring $n$ insures that before escaping from the bowl all liquid is finally subjected to the maximum centrifugal force.

The size of the restricted passages $j$ is a variable factor that depends upon the capacity of the bowl rather than its size; the capacity, in a bowl of given size, varying with the particular liquid treated, some liquids being much more readily clarifiable than others. Thus, in a bowl having a capacity of 200 gallons an hour, eight holes of one-quarter inch diameter are sufficient. If operating on a liquid that is very hard to clarify, the capacity will be much less and the size or number of the holes should be reduced. The given dimensions of passages $j$ with a bowl of assumed capacity are merely illustrative, the necessary governing factor being best expressed by the statement that the passages should be so narrow that a considerable head will be required to force the liquid through them, so that, by their throttling effect, they will cause equal delivery of liquid to all quarters of the annular chamber *l*.

Having now fully described my invention, what I claim and desire to protect by Letters Patent is:

1. In a centrifugal clarifier, in combination, a plurality of consecutive chambers of progressively increasing centrifugal force, there being contracted passages from one chamber to another.

2. In a centrifugal clarifier, in combination, a feed tube with closed bottom and side outlet, a rotatable clarifier bowl having a central clarifying chamber and an annular clarifying chamber, there being contracted passages between the chambers, and means to cause all liquid to approach closely to the maximum radius of the bowl before escaping.

3. In a centrifugal clarifier bowl, in combination, a central clarifying chamber of low centrifugal force, a circular weir controlling the outflow from said chamber, there being contracted passages from the discharge side of the weir, and an annular clarifying chamber of relatively high centrifugal force fed by said contracted passages.

4. In a centrifugal clarifier bowl, in combination, means dividing the bowl into an inner chamber of low centrifugal force and an outer chamber of high centrifugal force, a weir located relatively near the axis of rotation of the bowl and over which the liquid in the inner chamber nearest the axis of the bowl is discharged inwardly, there being a passage beneath the inner chamber through which the liquid so discharged passes to the outer chamber.

5. A centrifugal clarifier, comprising a plurality of consecutive clarifying chambers of progressively increasing centrifugal force, the inner chamber having a bottom sloped upward and inward to a free edge which forms a weir, over which liquids must flow in passing the inner chamber toward the outer chambers.

6. In a centrifugal clarifier, in combination, a preliminary clarifying chamber of low centrifugal force, a concentric circular discharge weir of relatively small diameter, a final clarifying chamber of high centrifugal force fed by the overflow of said weir, and means to cause all the liquid to approach closely to the maximum radius of the bowl before discharging from the final chamber.

7. In a centrifugal clarifier bowl, the combination, with the bowl, of a partition dividing the bowl into an inner chamber of low centrifugal force and an outer chamber of high centrifugal force, the bottom of the inner chamber nearer the axis being at a higher elevation than that part of the bottom nearest the partition and having a free inner edge forming a weir over which the liquid flows in its passage to the outer chamber.

8. In a centrifugal clarifier bowl, the combination with a bowl rotatable on a vertical axis and means dividing the bowl into two concentric clarifying chambers, the center, measuring in a vertical direction, of the outer chamber being substantially below the center, measured in the same direction, of the inner chamber, there being communicating means between the two passages so restricted as, by their throttling effect, to cause equal delivery of the liquid throughout the outer chamber.

In testimony of which invention, I have hereunto set my hand, at Poughkeepsie, N. Y., on this 15 day of August, 1919.

MEREDITH LEITCH.